United States Patent
Dzung

(10) Patent No.: US 9,614,577 B2
(45) Date of Patent: Apr. 4, 2017

(54) CLOCK SYNCHRONIZATION FOR LINE DIFFERENTIAL PROTECTION

(71) Applicant: ABB RESEARCH LTD, Zurich (CH)

(72) Inventor: Dacfey Dzung, Wettingen (CH)

(73) Assignee: ABB Schweiz AG, Baden (CH)

(*) Notice: Subject to any disclaimer, the term of this patent is extended or adjusted under 35 U.S.C. 154(b) by 541 days.

(21) Appl. No.: 13/949,442

(22) Filed: Jul. 24, 2013

(65) Prior Publication Data

US 2014/0036963 A1 Feb. 6, 2014

(30) Foreign Application Priority Data

Jul. 31, 2012 (EP) .................... 12178590

(51) Int. Cl.
| | | |
|---|---|---|
| *H02H 3/28* | (2006.01) | |
| *G06F 11/16* | (2006.01) | |
| *H04B 1/7073* | (2011.01) | |
| *H02J 3/08* | (2006.01) | |
| *H04J 3/06* | (2006.01) | |

(52) U.S. Cl.
CPC ............ *H04B 1/7073* (2013.01); *H02H 3/28* (2013.01); *G06F 11/1658* (2013.01); *H02J 3/08* (2013.01); *H04J 3/0667* (2013.01)

(58) Field of Classification Search
CPC . H02H 3/28; H02J 3/08; H04B 1/7073; H04J 3/0667
See application file for complete search history.

(56) References Cited

U.S. PATENT DOCUMENTS

| | | | | |
|---|---|---|---|---|
| 4,490,050 | A | * | 12/1984 | Singhi ..................... G04G 7/00 368/46 |
| 4,855,861 | A | * | 8/1989 | Bergman et al. ............... 361/65 |
| 5,958,060 | A | * | 9/1999 | Premerlani ............... G06F 1/14 713/400 |
| 7,865,331 | B2 | * | 1/2011 | Dzung et al. ................. 702/176 |
| 9,106,365 | B1 | * | 8/2015 | Bonicatto ................. H04L 7/00 |
| 2002/0057544 | A1 | * | 5/2002 | Sugiura et al. ................. 361/68 |
| 2004/0179432 | A1 | * | 9/2004 | Burke ................... G04C 13/027 368/46 |

(Continued)

OTHER PUBLICATIONS

European Search Report issued on Dec. 21, 2012.

*Primary Examiner* — Thomas Lee
*Assistant Examiner* — Danny Chan
(74) *Attorney, Agent, or Firm* — Taft Stettinius & Hollister LLP

(57) ABSTRACT

A method and arrangement are provided for time synchronization between two geographically separated stationary clocks, such as first and second clocks located respectively at first and second ends of an AC power line. A first representation of an oscillating power line quantity is produced by measuring or recording the power line quantity at the first end of the power line, and time-stamping the first representation by the first clock. A second representation of the same oscillating power line quantity is produced by measuring the power line quantity at the second end of the power line, and time-stamping the second representation by the second clock. The first and second representations are compared to determine a clock offset between the first and second clocks. Based on the comparison, one or both of the first and second clocks are adjusted to reduce the determined clock offset.

12 Claims, 2 Drawing Sheets

(56) References Cited

U.S. PATENT DOCUMENTS

| | | | |
|---|---|---|---|
| 2005/0017847 A1* | 1/2005 | Bonicatto | G01D 4/004 |
| | | | 375/356 |
| 2005/0036254 A1* | 2/2005 | Premerlani et al. | 361/69 |
| 2005/0049806 A1* | 3/2005 | Premerlani | G01R 19/2513 |
| | | | 702/64 |
| 2005/0108289 A1* | 5/2005 | East | G06F 17/30575 |
| 2007/0014313 A1* | 1/2007 | Bickel | H02J 13/0006 |
| | | | 370/503 |
| 2008/0049880 A1* | 2/2008 | Zweigle | H04L 7/0029 |
| | | | 375/355 |
| 2009/0088989 A1 | 4/2009 | Guzman-Casillas | |
| 2009/0174976 A1* | 7/2009 | Saga et al. | 361/65 |
| 2010/0188938 A1* | 7/2010 | Johnson | G01D 4/004 |
| | | | 368/47 |
| 2010/0192001 A1* | 7/2010 | Cornwall | G01D 4/004 |
| | | | 713/400 |
| 2011/0063766 A1 | 3/2011 | Kasztenny et al. | |
| 2011/0069421 A1* | 3/2011 | Marmonier | 361/93.1 |
| 2011/0144931 A1* | 6/2011 | Smit | H02H 7/261 |
| | | | 702/59 |
| 2011/0286350 A1* | 11/2011 | Wimmer | H02H 1/0061 |
| | | | 370/252 |
| 2012/0162843 A1 | 6/2012 | Kasztenny et al. | |
| 2015/0171621 A1* | 6/2015 | Oda | 361/64 |
| 2015/0312023 A1* | 10/2015 | Rice | H04L 7/0041 |
| | | | 375/371 |

\* cited by examiner

CLOCK SYNCHRONIZATION FOR LINE DIFFERENTIAL PROTECTION

RELATED APPLICATION

This application claims priority under 35 U.S.C. §119 to European Patent Application No. 12178590.1 filed in Europe on Jul. 31, 2012, the entire content of which is hereby incorporated by reference in its entirety.

FIELD

The present disclosure relates to the field of time synchronization between two geographically separated stationary clocks, for example, clocks at two ends of a power transmission line.

BACKGROUND INFORMATION

Power transmission lines are a crucial part of any electrical distribution system, as they provide a path to transfer power between generation and consumer. Power transmission lines are closely interconnected for a reliable operation. Economic and environmental requirements lead to operation of power transmission lines close to their operating limits. Any fault will cascade into a system wide disturbance causing widespread outages for a tightly interconnected system operating close to its limits. Therefore, transmission protection systems are set up to identify faults. The main task for the transmission line protection lies in reliably detecting faults compromising the security of the system.

For differential protection systems of power transmission lines, protection devices at both ends of the transmission line measure a representation of a power line quantity such as current and compare the measured quantity of both ends. Under normal fault-free conditions, the quantity is the same at both ends. Deviating measurements indicate a fault on the transmission line and trigger protection actions such as opening a circuit breaker. A prerequisite for the laid out differential protection system is precise synchronization of the measurement devices on both ends.

For synchronizing, distributed protection device clocks are aligned to a master clock of some sort. In order to do so, a common clock source sends a synchronization signal for example, through a communication network. Each clock of the distributed protection devices receives the synchronization signal and performs necessary adjustments accordingly. Generally synchronization signals are sent from a global positioning system (GPS) satellite clock via direct or indirect satellite communication, or from a network master clock via a communication network to which the protection devices are connected.

However, synchronization with a master clock can neither be always reliable nor cost effective. Reception of a GPS based synchronization signal can be costly and even unreliable, as communication with the satellite can be interrupted for example, by radio interference or severe weather conditions impairing signal propagation. In addition, network-based synchronization assumes communication delays between clocks to be symmetric, i.e. equal in both directions, an assumption which is not generally guaranteed.

SUMMARY

An exemplary embodiment of the present disclosure provides a method of synchronizing a first clock and a second clock located respectively at a first end and a second end of an AC power line. The exemplary method includes producing a first representation of an oscillating power line quantity by measuring the power line quantity at the first end of the power line, and time-stamping the first representation by the first clock. The exemplary method also includes producing a second representation of the oscillating power line quantity by measuring the power line quantity at the second end of the power line, and time-stamping the second representation by the second clock. In addition, the exemplary method includes comparing the first and the second representations to determine a clock offset between the first clock and the second clock. The exemplary method also includes adjusting one or both of the first clock and second clock to reduce the determined clock offset.

An exemplary embodiment of the present disclosure provides an arrangement for synchronizing a first clock and a second clock located respectively at a first end and a second end of a power line. The exemplary arrangement includes a recorder configured to measure a first representation of an oscillating power line quantity at a first end of the power line and to time-stamp the first representation by the first clock. The exemplary arrangement also includes a receiver configured to receive a second representation of the oscillating power line quantity measured at the second end of the power line and time-stamped by the second clock. In addition, the exemplary arrangement includes a comparator configured to compare the first representation and the second representation to determine a clock offset between the first clock and the second clock. The exemplary arrangement also includes a clock adjuster configured to adjust the first clock to reduce the determined clock offset.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings, and their meanings, are listed in summary form in the list of designations. In principle, identical or similarly functioning parts are provided with the same reference symbols in the drawings.

DETAILED DESCRIPTION

Figure 1:
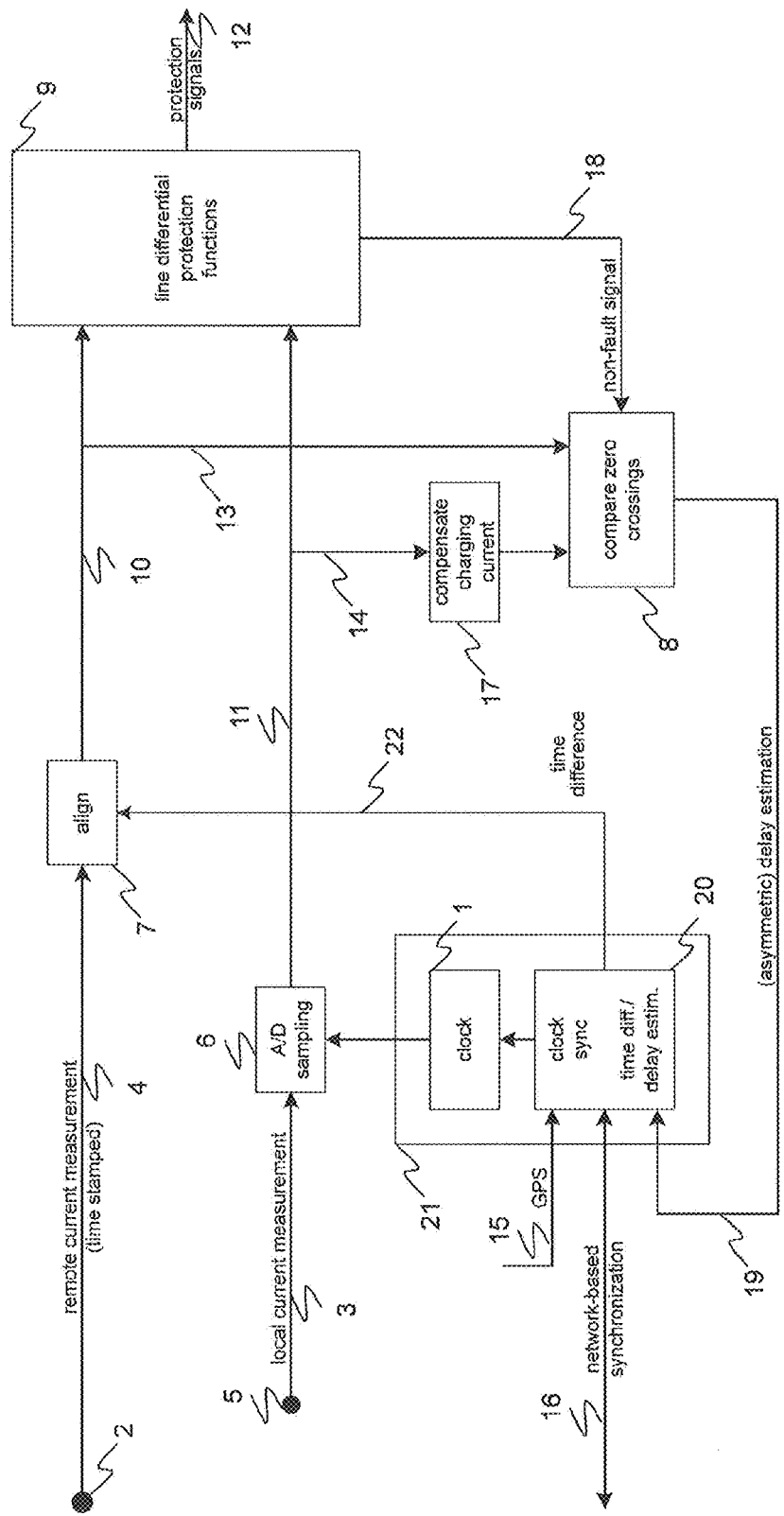
FIG. 1 shows a schematic overview of a method to synchronize clocks located at two ends of a power transmission line and used for differential protection of said power transmission line, according to an exemplary embodiment of the present disclosure.

Exemplary embodiments of the present disclosure increase the reliability of protection systems for a power transmission line, for example, to improve clock synchronization of such a system.

Exemplary embodiments of the present disclosure provide a method and an arrangement for synchronizing clocks located at opposite ends of a power line.

According to an exemplary embodiment of the present disclosure, a first clock and a second clock located respectively at a first end and a second end of an AC power line are aligned according to an oscillating power line quantity such as a current, for example. The two clocks are initially synchronized to be within a period of a frequency of the power line quantity. In order to synchronize the clocks, a first representation such as a waveform of an oscillating power line quantity is produced by measuring the power line quantity at the first end of the power line. For example, the quantity can be measured or recorded with a sufficient number of samples within an oscillation period such that the oscillating quantity is represented properly and can be compared with other measurements at different points in time or space. As important as the value or values of the first representation is, the time it was recorded or measured, thus, the samples taken get time stamped by the first clock located at the first end of the AC power line. This actually allows for keeping track of the timing of the first clock.

For synchronization, measurement of the same oscillating power line quantity is also needed from the second end of the power line. Therefore, a second representation of the oscillating power line quantity is measured at the second end of the power line. In order to be able to make a correlation between clock and power line quantity, the second representation is time stamped by the second clock.

In addition, the first and second representations can be sent to either one or both of the two ends of the power line or any other common location for comparing the first and the second representation. The comparison can be performed by aligning the representations and determining a clock offset between the first and second clocks by using the respective time-stamps. In other words, the clock offset is assumed to correspond to the time interval by which one of the representations has to be shifted in order to match or overlap the other representation of the oscillating property.

Eventually, an adjustment is carried out to reduce the determined clock offset, wherein one or both of the first and second clocks are set or reset based on the comparison and the calculated offset.

In accordance with an exemplary embodiment of the present disclosure, the first representation or a copy of it is transmitted or sent via a communication link to the second end of the power line, and only the second clock is adjusted by the determined clock offset. In this way, the method can be carried out quickly and easily as only one message needs to be sent and only one clock needs to be adjusted.

In accordance with an exemplary embodiment of the present disclosure, the clock offset is determined by calculating a difference between a first-clock timestamp t1 of a zero crossing of the first representation and a second-clock timestamp t2 of a zero crossing of the second representation. However, the clock offset can also be determined by calculating a correlation function between the two representations involving the entire waveform. This approach is more complex but also more reliable, thus more robust to noisy measurements.

However, in some cases, there might be a noticeable phase difference between the oscillating power line quantity at the first end and at the second end of the power line due to line charging current effects, for example, with long lines during light load conditions. Such an inherent, clock-sync-independent phase difference needs to be compensated in order to achieve high accuracy clock synchronization, which includes calculating the phase difference, and adjusting the previously determined clock offset by adding or subtracting a time delay corresponding to the calculated phase difference.

A prerequisite to carry out the method according to the present disclosure is the initial fault-free operation of the power transmission line. Therefore, according to an exemplary embodiment of the present disclosure, a Line Differential Protection function may be used to signal fault-free operation of the power line before the method and eventually the alignment of the clocks can be carried out. However, if operation is not fault-free, the clock adjustment cannot proceed until a fault-free operation is restored and signaled.

The method according to the present disclosure is particularly useful as a fine adjustment or high precision synchronization as other synchronization methods can experience inherent time delays or shifts. For example, in network-based time synchronization, an underlying assumption is symmetric inter-node communication. However, in modern communication networks, this basic assumption cannot be valid. This is particularly important where a synchronization message inter-node travel time exceeds the symmetric delay calculated previously and used to compensate a residual clock offset at the receiving node.

Therefore, the present disclosure is particularly useful, where prior to executing the method, the first clock and the second clock are synchronized based on a symmetric communication delay established for a fully operational network-based time synchronization such as Network Time Protocol (NTP) or Precision Time Protocol (PTP) of a communication link between the first end and the second end of the power line. Exemplary embodiments of the present disclosure take into account any asymmetric time delays within a network-based time synchronization method and provides a high precision synchronization.

Furthermore, the method according to the present disclosure is useful in case of a global positioning system (GPS) based time synchronization, where the GPS signal can be lost at times. Thus, the present disclosure provides synchronization, wherein prior to executing the method of the present disclosure, the first clock and the second clock are synchronized based on a GPS signal, and following a loss of the GPS signal, the synchronization of the clocks is maintained for a holdover period exceeding 30 seconds, for example.

The present disclosure also relates to an arrangement for synchronizing a first clock and a second clock located respectively at a first end and a second end of a power line. In accordance with an exemplary embodiment, the arrangement includes a recorder for measuring a first representation of an oscillating power line quantity such as current at a first end of the power line and for time-stamping the first representation by the first clock. The arrangement also includes a receiver for receiving a second representation of the oscillating power line quantity measured at the second end of the power line and time-stamped by the second clock. The apparatus includes a comparator for comparing the first representation and the second representation to determine a clock offset between the first clock and the second clock. In addition, the arrangement includes a clock adjuster for adjusting the first clock to reduce the determined clock offset.

Given an initial fault-free state of the power transmission line, the present disclosure synchronizes clocks located at ends of a power transmission line based on a measured and time-stamped representation with high precision and reliability. This way, the present disclosure can be used as a stand-alone or add-on synchronization method overcoming shortcomings of other, for example, network or GPS based, synchronization methods.

FIG. 1 shows a schematic overview of the first end of a line differential protection system for a power transmission line including a first clock 1 and a second clock 2 located at each end of a power transmission line. A first representation 3 and a second representation 4 of an oscillating power line quantity q are produced at a first recorder 5 at a first local location, and a second recorder at a remote second location. The recorder 5 measures, for example, a current multiple times within a period of oscillation in order to produce a representation 3 suitable for synchronization. The first representation 3 is time stamped by the first clock 1 using a sampling unit 6.

The time stamped representations 3, 4 are forwarded to a line differential protection function 9, for example, via network links 10, 11 in order to check the line status and detect any faults of the power transmission line. The line differential protection function 9 generates a signal 18 containing the status of the power transmission line and forwards the signal to respective recipients through a network.

The time stamped representation 3, 4 are further forwarded via network links 13, 14 for further processing to a comparator 8, where any offset or a asymmetric delay estimation is calculated. Any phase difference between the oscillating power line quantity at the first end and at the second end of the power line due to line charging current effects can be previously compensated for by a phase compensator 17.

In accordance with an exemplary embodiment of the present disclosure, the first clock 1 is generally synchronized via a GPS signal 15 or a network-based synchronization signal 16. However, in case there is a loss of the GPS signal 15, the present disclosure provides a method to synchronize the clocks 1, 2 during the loss of the GPS signal 15. In addition, the present disclosure provides a system and a method to perform a higher precision synchronization of clocks 1, 2 in case of any asymmetry in the network synchronization signal 16.

After receiving the first and second representations 3, 4, the comparator 8 calculates an offset 19. In case the comparator 8 receives a non-fault status signal 18 from the line differential protection function 9, the offset 19 is forwarded to a synchronization unit 20 of a timing unit 21 included in the synchronization unit 20 and, for example, the first clock 1. The synchronization unit 20 then resets or aligns the first clock and/or can send the respective offset 22 for partial aligning to the receiver 7 for adjusting the time stamps of the remote representation 4.

Figure 2:
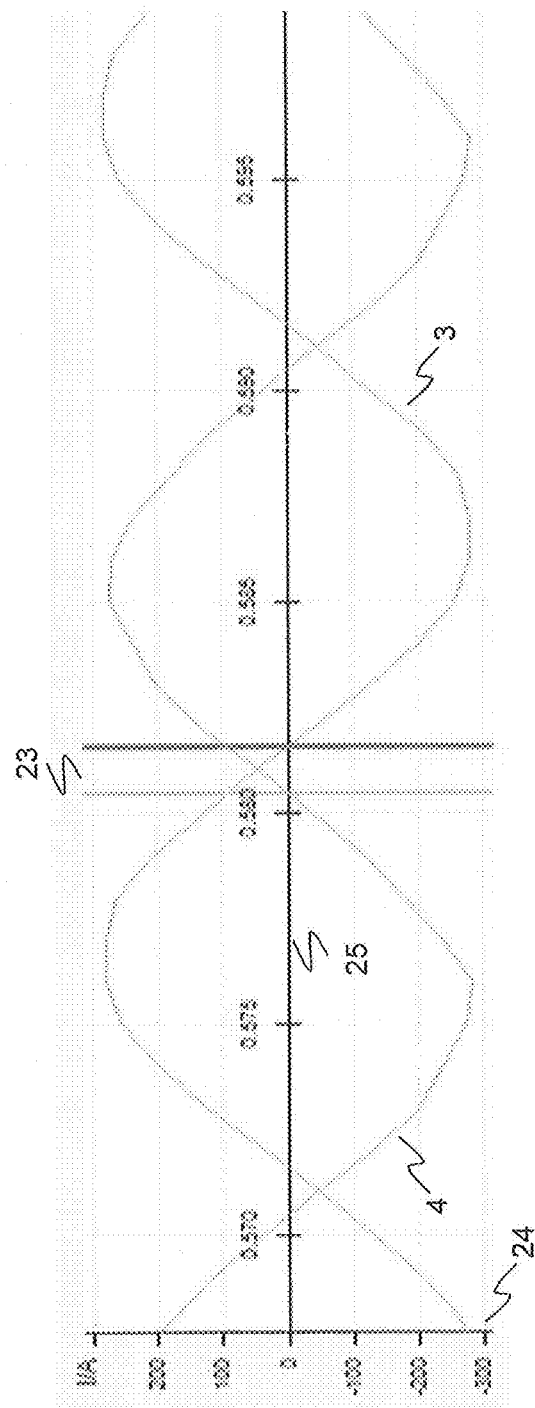
FIG. 2 depicts two representations of an oscillating power line quantity as recorded with two clocks experiencing a slight offset, according to an exemplary embodiment of the present disclosure.

FIG. 2 depicts a shift 23 observed at a line differential protection device. The plot shows a local signal or first representation 3 and a remote signal or second representation 4 of a line current with an amplitude at y-axis 24 as a function of, respectively, local and remote time reported on x-axis 25. The observed shift 23 is due to a clock offset between local and remote clocks, and can also include a phase difference due to line charging current effects. The present disclosure exploits this observed shift to correct any clock offset, such as arising, for example, due to asymmetric communication time delays within a network-based time synchronization method, and thus provides a high precision synchronization.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 First clock
2 Second clock
3 First representation
4 Second representation
5 Recorder
6 Sampling unit
7 Receiver
8 Comparator
9 Line differential protection function
10 Network link
11 Network link
12 Line protection signal
13 GPS signal
14 Network synchronization signal
17 Phase compensator
18 Status signal
19 Offset
20 Synchronization unit
21 Timing unit
22 Offset
23 Asymmetry
24 Y-axis
25 X-axis

What is claimed is:

1. A method of synchronizing a first clock and a second clock located respectively at a first end and a second end of an AC power line, the method comprising:
   producing a first representation of an oscillating power line quantity by measuring the power line quantity at the first end of the power line, and time-stamping the first representation by the first clock;
   producing a second representation of the oscillating power line quantity by measuring the power line quantity at the second end of the power line, and time-stamping the second representation by the second clock;
   comparing the first and the second representations to determine a clock time offset between the first clock and the second clock;
   adjusting one or both of the first clock and second clock to reduce the determined clock time offset; and
   checking whether a Line Differential Protection function signals fault-free operation of the power line, wherein the adjusting of the one or both of the first clock and second clock does not occur until a fault-free operation is restored and signaled.

2. The method of claim 1, comprising:
   transmitting the first representation to the second end of the power line; and
   adjusting the second clock by the determined clock time offset.

3. The method of claim 1, wherein the determining of the clock offset time comprises:
   calculating a difference between a timestamp of a zero crossing of the first representation and a timestamp of a zero crossing of the second representation.

4. The method of claim 1, wherein the determining of the clock time offset comprises:
   calculating a correlation function between the two representations and determining a location of a peak of the correlation function.

5. The method of claim 1, wherein the determining of the clock time offset comprises:
   compensating a phase difference between the oscillating power line quantity at the first end and at the second end of the power line.

6. The method of claim 1, comprising:
   checking whether the determined clock time offset is within a predetermined limit.

7. The method of claim 1, comprising:
synchronizing the first clock and the second clock based on a symmetric communication delay of a communication link between the first end and the second end of the power line; and
reducing any residual clock time offset between the first clock and second clock.

8. The method of claim 1, comprising:
synchronizing the first clock and the second clock based on a GPS signal; and
maintaining the synchronization of the clocks following a loss of the GPS signal.

9. The method of claim 1, wherein the oscillating power line quantity is a current.

10. The method of claim 9, wherein the determining of the clock time offset comprises:
calculating a difference between a timestamp of a zero crossing of the first representation of the current and a timestamp of a zero crossing of the second representation of the current.

11. The method of claim 9, wherein the determining of the clock time offset comprises:
calculating a correlation function between the two representations of the current and determining a location of a peak of the correlation function.

12. An arrangement for synchronizing a first clock and a second clock located respectively at a first end and a second end of a power line, the arrangement comprising:
a recorder configured to measure a first representation of an oscillating power line quantity at the first end of the power line and to time-stamp the first representation by the first clock;
a receiver configured to receive a second representation of the oscillating power line quantity measured at the second end of the power line and time-stamped by the second clock;
a Line Differential Protection function configured to generate a non-fault status signal when no faults are detected in the power line;
a comparator configured to compare the first representation and the second representation to determine a clock time offset between the first clock and the second clock; and
a clock adjuster configured to adjust the first clock to reduce the determined clock time offset, wherein the clock adjuster does not adjust the first clock until the Line Differential Protection function generates the non-fault status signal.

* * * * *